2,439,437

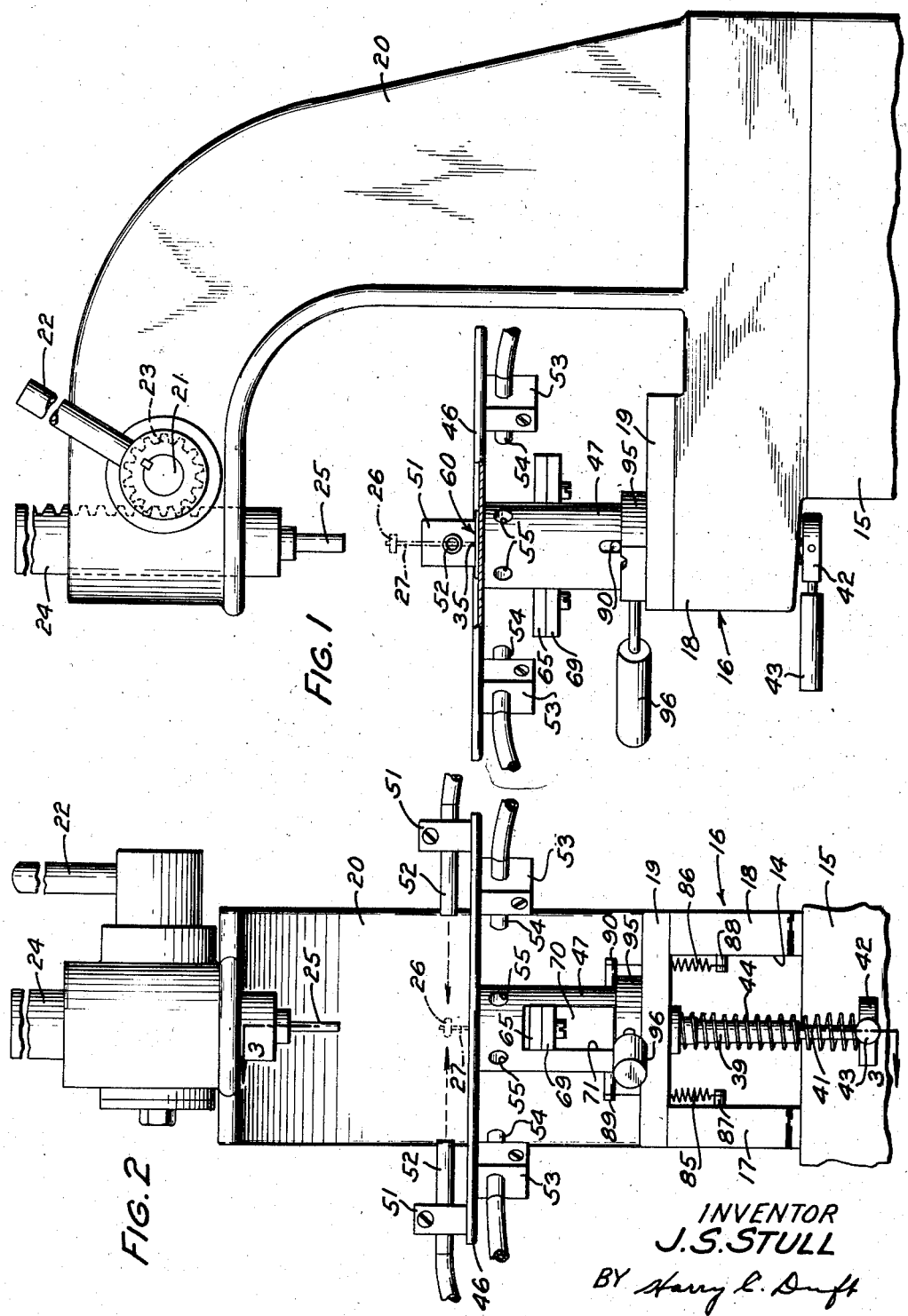
April 13, 1948.  J. S. STULL  2,439,437
APPARATUS FOR FORMING GLASS BEADS ON METALLIC ELEMENTS
Filed July 14, 1944  3 Sheets-Sheet 1
INVENTOR
J. S. STULL
BY Harry L. Duft
ATTORNEY April 13, 1948.                 J. S. STULL                 2,439,437
           APPARATUS FOR FORMING GLASS BEADS ON METALLIC ELEMENTS
                    Filed July 14, 1944           3 Sheets-Sheet 2
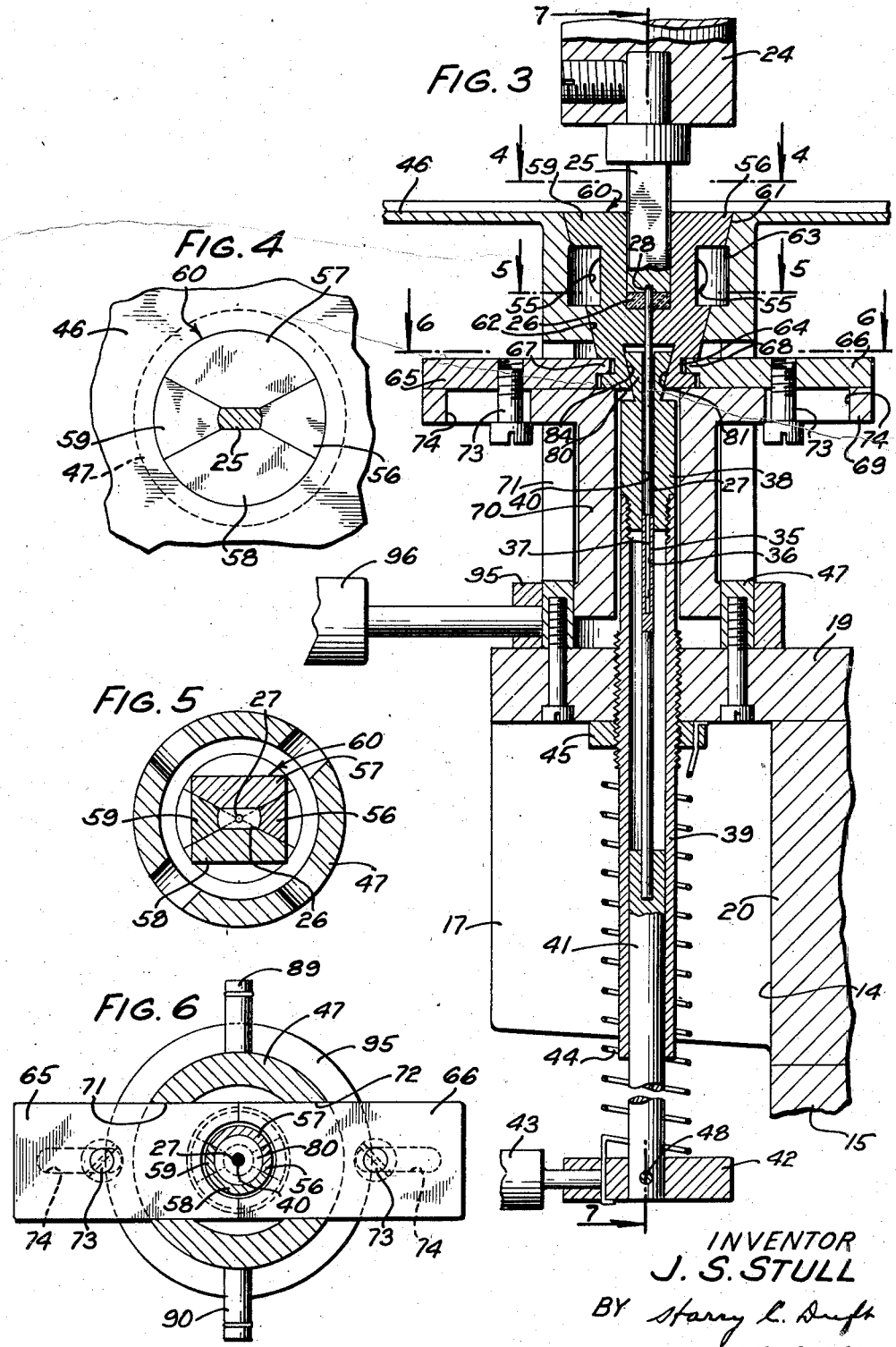
INVENTOR
J. S. STULL
BY Harry L. Duft
ATTORNEY April 13, 1948.    J. S. STULL    2,439,437
APPARATUS FOR FORMING GLASS BEADS ON METALLIC ELEMENTS
Filed July 14, 1944    3 Sheets-Sheet 3
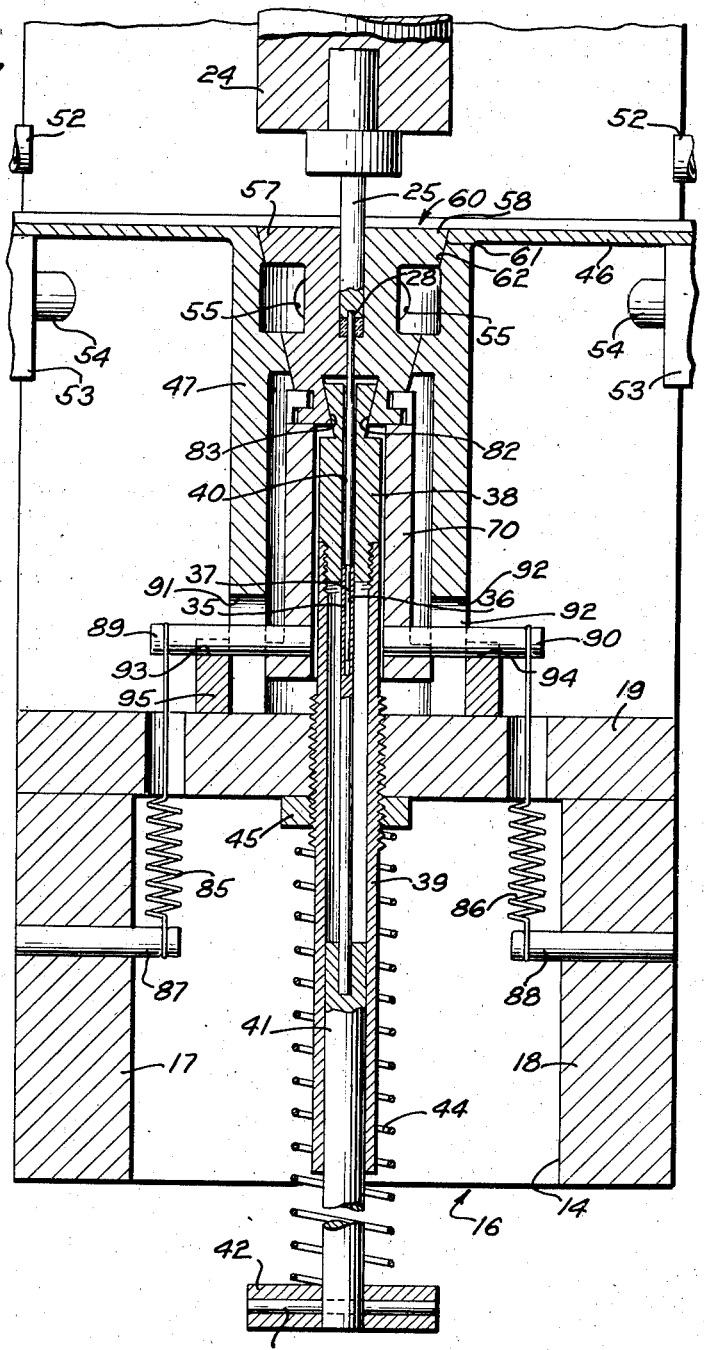
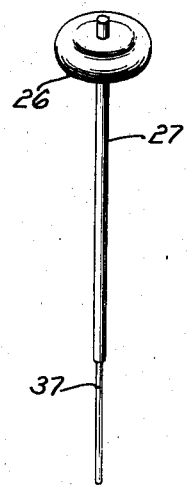
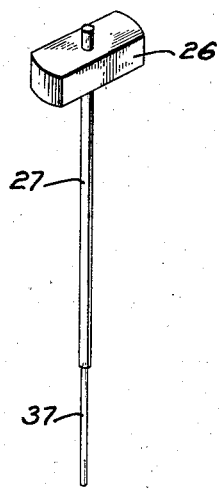
INVENTOR
J. S. STULL
BY
ATTORNEY Patented Apr. 13, 1948

UNITED STATES PATENT OFFICE 2,439,437

APPARATUS FOR FORMING GLASS BEADS ON METALLIC ELEMENTS

John S. Stull, Chicago, Ill., assignor to Western Electric Company, Incorporated, New York, N. Y., a corporation of New York Application July 14, 1944, Serial No. 544,918

3 Claims. (Cl. 49—66)

This invention relates to an apparatus for forming glass on a metal element and more particularly to an apparatus for molding a glass bead on the output lead of an electronic tube.

In the manufacture of some electronic devices, it is essential that as nearly perfect alignment as possible be maintained between the central conducting output lead of the device and its glass envelope. In the past, the practice has been to form the spacing element between the central conductor and envelope by machining a globule or bead of glass, attached to the conductor, to the desired shape so that it will space the conductor from the envelope.

It is an object of the present invention to provide a simple and very accurate apparatus for rapidly forming an article.

In accordance with one embodiment of the invention, an apparatus is provided for molding a glass bead previously attached to the output lead of the electronic device wherein a vertically reciprocable lead supporting and guide post, having a central aperture therein for receiving the shank of the lead, is normally urged to a position to receive the lead with the glass bead attached thereto and may be depressed to carry the bead first into the path of heating flames to plasticize the glass bead and then to position it in a four-part die. In the practice of the invention, an operator may manipulate the lead guiding post to first carry it into position in the heating flames, whereupon, after the glass bead has been heated, the operator compresses the bead somewhat with a suitably shaped pair of pliers to facilitate the entrance of the bead into the molding die, unless the bead has been previously so formed. The four parts of the die cooperate to provide a central aperture through which the lead may pass its supporting guide post. After the post has been lowered to permit the partially formed bead of glass to move down onto the forming dies, a conducting plunger may be actuated to force the globule or bead of glass down into the die, where it will be molded to the desired configuration. The four-part die is mounted for reciprocation with respect to a frusto-conical passage, with which the outer surfaces of the four-part die cooperate, whereby, after the molding operation, the bead may be removed from the die by raising all four parts of the die simultaneously to cause them to move away from each other by the camming action of a cam coaxial with respect to the lead-supporting guide post. As soon as the parts of the die are disengaged from the bead, the guide post will move up to remove the bead from the die.

A complete understanding of the invention may be had by reference to the following detailed description when considered in conjunction with the accompanying drawings, wherein Fig. 1 is a side elevational view of an apparatus embodying the features of the invention, some parts being broken away to illustrate features of construction;

Fig. 2 is a front elevational view of the apparatus shown in Fig. 1;

Fig. 3 is a vertical sectional view on an enlarged scale and taken substantially along the line 3—3 of Fig. 2 in the direction of the arrows;

Figs. 4, 5 and 6 are plan sections taken substantially along the lines 4—4, 5—5 and 6—6, respectively, in Fig. 3 in the direction of the arrows and showing details of construction of the four-part die and its actuating mechanisms;

Fig. 7 is a vertical sectional view taken substantially along the line 7—7 of Fig. 3 in the direction of the arrows showing part of the mechanism for moving the four parts of the molding die apart;

Fig. 8 is a detailed view in perspective of the output lead of an electronic tube having a bead or globule of glass attached thereto prior to being formed in the present apparatus;

Fig. 9 is a detailed view showing the output lead with the glass bead thereon formed to the desired shape.

Referring to the drawings, wherein like reference characters designate the same parts throughout the several views, particular reference being first had to Figs. 1 and 2, it will be noted that the apparatus is mounted upon a suitable pedestal 15, on which a main frame, designated generally by the numeral 16, may be supported. The main frame 16 is cut away as shown at 14 to form a pair of side members 17 and 18, and supports, on its front end, a base plate 19. At the rear end of the main frame 16 a standard 20 is positioned to extend upwardly and over the base plate 19. At its upper end, the standard 20 has freely rotatable in it a shaft 21, which has suitably fixed to it an actuating handle 22 in the rack driving gear 23. The rack driving gear 23 meshes with a rack 24, on the lower end of which there is suitably mounted a compacting plunger 25 having an end conforming to the shape to which a glass bead 26 (Fig. 8) is to be formed.

In the operation of the apparatus, the bead 26, which has previously been attached to an output lead 27 to form a part of the thermionic tube, is to be molded to the shape shown in Fig. 9 and, therefore, the lower end of the compacting plunger 25 has a socket 28 formed in it, as shown most clearly in Figs. 3 and 7, to receive the upper end of the output lead 27. The depth of the socket 28 will control the distance the lead extends beyond the bead. After an output lead 27 has had the globule or bead 26 of glass attached to it, it may be inserted in the upper end of a supporting guide post 35, as shown most clearly in Figs. 3 and 7, in which there is a central bore or pocket 36 adapted to receive a reduced shank 37 of the output lead. The upper end of the post 35 slides in a cap member 38, which is threaded into a sleeve 39, in turn threadedly positioned in the base plate 19. The cap member 38 has a vertically extending passage 40 adapted to serve as a bearing for guiding the post 35. The lower end of the post 35 is attached to a plunger 41, carrying at its lower end a collar 42, pinned to the plunger 41 by means of a pin 48. The collar 42 has a handle 43 mounted on it whereby it may be manipulated. In addition to receiving the handle 43, the collar 42 has the lower end of a contractile spring 44 fixed to it, the upper end of the spring being attached to a lock nut 45 threaded onto the outer surface of the sleeve 39, thus to accurately position the sleeve 39 with respect to the base plate 19. Due to the just described construction, the spring 44 normally urges the plunger 41 to move upwardly in the sleeve 39 and to carry the supporting post 35 to a position just above a burner supporting plate 46 suitably attached to the upper end of a tubular support member 47, which is, in turn, mounted on the base plate 19. When the post 35 is in its uppermost position and the spring 44 is contracted, the upper surface of the collar 42 will strike the lower end of the sleeve 39, thus to position the post 35 as shown in Fig. 1, where it will be accessible to the operator so that the operator may insert the shank 37 of the output lead 27 in the post.

Mounted upon the upper surface of the burner supporting plate 46 are a pair of burner supporting brackets 51—51, which support burners 52—52 in position to project a flame against the glass bead 26 on an output lead when the plunger 41 is moved to the position shown in Fig. 2, thus to plasticize the glass bead sufficiently so that an operator may, by using a pincers or pliers (not shown), compress the bead of glass radially to permit its entrance into the molding dies to be described. In some instances, the bead 26 may be preliminarily formed and this compression thereof will not be necessary.

Also positioned on the burner supporting plate are four burner supporting brackets 53—53, which are positioned to carry burners 54—54 in position to direct flames through ports 55—55 formed in the support member 47 so that the flames will impinge upon die members 56, 57, 58 and 59 comprising parts of a four-part die, designated generally by the numeral 60. The four die members 56, 57, 58 and 59 cooperate to form an inverted substantially frusto-conical assembly, the sloping sides of which, as shown at 61, cooperate with a camming face 62 to cause the dies to move together when the dies are moved downwardly into the support member 47. Adjacent the area where the ports 55 extend through the side walls of the support member 47, an annular passage 63 is formed in the member 47 to permit the flames directed through the ports to heat the die members 56, 57, 58 and 59 equally.

The lower ends of the die members 56, 57, 58 and 59, constituting the molding die 60, are milled out to form an annular groove 64, adapted to receive the projecting ends of a pair of retainer plates 65 and 66 having cooperating shoulders 67 and 68 which extend into the groove 64, thus to permit movement of the die members 56, 57, 58 and 59 radially outwardly but retaining the die members in alignment horizontally on the upper surface of a die actuating plate 69. The plate 69 is suitably attached to or formed integrally with a tubular member 70, which is slidable within the support member 47. The plate 69 extends outwardly beyond the periphery of the support member 47 through a pair of slots 71 and 72 formed in the support member 47 and the retainer plates 65 and 66 may be attached to the upper surface of the actuating plate 69 by means of machine screws 73 threaded into the plates 65 and 66 and extending through slots 74—74 formed in the plate 69.

By means of this construction, any movement imparted to the tubular member 70 will be transmitted to the die members 56, 57, 58 and 59 to move the die members upwardly or downwardly as a unit and when the die members are moved downwardly, the sloping sides 62 of the support member 47 will cause the die members to be moved radially inwardly to the positions shown in Figs. 3 and 7. When the tubular member 70 is moved upwardly by mechanism to be described, the die members 56, 57, 58 and 59 will be caused to move radially outwardly to release them from the globule or bead 26 of glass which has been molded on the output lead 27, by means of an annular cam member 80 formed on the upper end of the cap member 38. This cam member 80 cooperates with camming surfaces 81, 82, 83 and 84 formed by milling out the lower ends of the die members 56, 57, 58 and 59, respectively.

The tubular member 70 is normally urged downwardly to the positions shown in Figs. 3 and 7 by a pair of contractile springs 85 and 86 attached to pins 87 and 88 mounted in the side plates 17 and 18, respectively. The springs 85 and 86 have their upper ends attached to a pair of posts 89 and 90, which are suitably attached to the tubular member 70 and which extend through slots 91 and 92 formed in the support member 47. Portions of the posts 89 and 90 will engage in notches 93 and 94 formed in a cam ring 95 when the tubular member 70 is in its lowermost position, as shown in Figs. 3 and 7. The cam ring 95 is provided with a handle 96, whereby the ring may be rotated around the support member 47 which it encircles, thus to move the tubular member 70 to either of its two positions. When the cam ring 95 is in the position shown in Fig. 7, the tubular member 70 will be in its lowermost position and when the cam ring 95 is moved out of the position shown in Fig. 7, the tubular member 70 will be raised due to the camming action between the surfaces of the notches 93 and 94 and the lower surfaces of the posts 89 and 90.

A better understanding of the invention may be had by reference to the following brief description of the mode of operation of the apparatus. With the plunger 41 in its released or normal position, the post 35 will be in its uppermost position due to the spring 44 holding the collar 42 against the lower end of the sleeve 39 and in this position an operator may readily insert the shank 37 of the output lead 27 in the post 35. The globule of glass, in the form of a bead 26, has, in a previous operation been applied to the output lead 27 and, upon proper manipulation of the handle 43, the bead of glass attached to the output lead may be moved down into the flame projecting from the burner 52 and heated sufficiently to plasticize it, whereupon, the operator may, if necessary, manually compress the bead 26 with any suitable forming tool so that the bead 26 will be flattened on its sides to facilitate its entrance into the die 60. After the bead has thus been plasticized, the handle 43 may be moved downwardly to cause the bead the bead of glass to rest upon the upper surfaces of the die members 56, 57, 58 and 59 comprising the die 60. In some cases, the bead will drop into the dies and in others it will rest on the edges of the upper surfaces of the die. Immediately after the handle 43 has been moved to its lowermost position, the handle 22 may be operated to cause the plunger 25 to move downwardly and compact the glass in the die 60. Since the plunger 25 has the socket 28 formed in its lower end for receiving the upper extending end of the output lead 27, the globule of glass will be formed in the shape shown in Fig. 9, a predetermined distance from the end of the lead 27, being maintained plastic by the heat transferred to it through the die members 56, 57, 58 and 59, which are heated by the burners 54. After the globule of glass has been properly formed, the handle 96 may be manipulated to rotate the cam ring 95 and thus cam the tubular members 70 upwardly. As the tubular member 70 moves upwardly, the plunger 25 having been raised to its upper position, as shown in Fig. 1, the die members 56, 57, 58 and 59 will move radially outwardly under the influence of the annular cam member 80 acting on the camming surfaces shown at 81 to 84 on the respective die members, thus to release the dies from the glass and permit the spring 44 to move the output lead upwardly, carrying the properly formed bead of glass thereon up to the position shown in Fig. 1, whereupon the completed article may be removed from the apparatus by the operator.

What is claimed is:

1. In an apparatus for accurately forming a glass spacer element on the output lead of an electronic tube, means for supporting the output lead, means operable to move said supporting means, means surrounding said supporting means to guide it in its movement, a tubular member surrounding said guiding means and reciprocable with respect thereto, a support member surrounding said reciprocable tubular member, a plurality of die members having cam surfaces to engage the support member and supported jointly by said support member and by said tubular member, a cam member on said guiding means, other cam surfaces on the die members for cooperating with the cam member on the guiding means to effect the opening of said die members when the tubular member is moved in one direction, and cam surfaces on the support member for cooperation with the first mentioned cam surfaces on the die members to effect the closing of the die members when the tubular member is moved in the opposite direction.

2. In an apparatus for accurately forming a glass spacer element on the output lead of an electronic tube, means for supporting the output lead, means operable to move said supporting means, means surrounding said supporting means to guide it in its movement, a tubular member surrounding said guiding means and reciprocable with respect thereto, a support member surrounding said reciprocable tubular member, a plurality of die members having cam surfaces to engage the support member and supported jointly by said support member and by said tubular member, a cam member on said guiding means, other cam surfaces on the die members for cooperating with the cam member on the guiding means to effect the opening of said die members when the tubular member is moved in one direction, cam surfaces on the support member for cooperation with the first mentioned cam surfaces on the die members to effect the closing of the die members when the tubular member is moved in the opposite direction, a chamber formed internally of the support member, and passageways in said support member for directing a heating medium through the support member to the die members.

3. In an apparatus for accurately forming a glass spacer element on the output lead of an electronic tube, means for supporting the output lead, means for urging said supporting means to a predetermined position, means surrounding said supporting means to guide it, a tubular member surrounding the guiding means and reciprocable with respect thereto, a support member surrounding said reciprocable tubular member, a plurality of die members slidably supported jointly by the support member and the tubular member and having cam surfaces thereon, a cam member on the guiding means, cam surfaces on the support member and cam member for cooperation with the cam surfaces on the die members to effect the opening and closing of the die members upon reciprocation of the tubular member, a chamber formed internally of the support member, passageways in the support member for directing a heating medium through the support member to the die member, a camming ring rotatable around said support member, and means attached to the tubular support member and extending through the support member for actuation by said camming ring upon rotation thereof to move the tubular member.

JOHN S. STULL.

REFERENCES CITED

The following references are of record in the file of this patent:

UNITED STATES PATENTS

| Number | Name | Date |
|---|---|---|
| 614,843 | Criggal | Nov. 29, 1898 |
| 851,904 | Steimer | Apr. 30, 1907 |
| 1,789,014 | Millar | Jan. 13, 1931 |
| 2,195,483 | Franke | Apr. 2, 1940 |
| 2,347,421 | Little | Apr. 25, 1944 |